(12) United States Patent
Dini et al.

(10) Patent No.: US 7,631,225 B2
(45) Date of Patent: Dec. 8, 2009

(54) APPROACH FOR CHARACTERIZING THE DYNAMIC AVAILABILITY BEHAVIOR OF NETWORK ELEMENTS

(75) Inventors: Cosmin Nicu Dini, San Jose, CA (US); Petre Dini, San Jose, CA (US); Manuela I. Popescu, San Jose, CA (US); Masum Z. Hasan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 730 days.

(21) Appl. No.: 10/956,286

(22) Filed: Oct. 1, 2004

(65) Prior Publication Data

US 2006/0075275 A1 Apr. 6, 2006

(51) Int. Cl.
*G06F 11/00* (2006.01)
(52) U.S. Cl. ....................................... 714/43
(58) Field of Classification Search ................. 714/702, 714/704, 4, 43
See application file for complete search history.

(56) References Cited

U.S. PATENT DOCUMENTS

| | | | | |
|---|---|---|---|---|
| 4,070,647 | A * | 1/1978 | Robson | 714/704 |
| 5,341,477 | A | 8/1994 | Pitkin et al. | |
| 5,481,548 | A * | 1/1996 | Wallace | 714/712 |
| 6,003,090 | A * | 12/1999 | Puranik et al. | 709/235 |
| 6,073,089 | A * | 6/2000 | Baker et al. | 702/185 |
| 6,317,775 | B1 | 11/2001 | Coile et al. | |
| 6,496,948 | B1 | 12/2002 | Smorokinsky | |
| 6,629,148 | B1 | 9/2003 | Ahmed et al. | |
| 6,658,473 | B1 | 12/2003 | Block et al. | |
| 6,735,548 | B1 | 5/2004 | Huang et al. | |
| 6,754,854 | B2 * | 6/2004 | Kurrasch | 714/47 |
| 6,785,889 | B1 | 8/2004 | Williams | |
| 6,975,633 | B1 | 12/2005 | T'Joens | |

(Continued)

FOREIGN PATENT DOCUMENTS

JP 2000-311130 11/2000

(Continued)

OTHER PUBLICATIONS

Johnson, Barry W. "Design and Analysis of Fault Tolerant Digital Systems" 1989, pp. 4-6, 17, 18, 219-223.*

(Continued)

*Primary Examiner*—Bryce P Bonzo
(74) *Attorney, Agent, or Firm*—Hickman Palermo Truong & Becker LLP (57) ABSTRACT

An approach is provided for characterizing the dynamic availability behavior of network elements using metrics that indicate patterns of availability of a network element over time. The metrics provide an indication of stability and instability of a network element and include one stability metric and three instability metrics. The stability metric is a stability order that indicates how long an operational state holds with respect to a prior operational state. The instability metrics include an instability order, a repeatability order and a multiplicity order. The instability order indicates how quickly a network element changes operational states. The repeatability order indicates short-term instability within a vicinity of a change in operational state. The multiplicity order indicates long-term instability. The metrics may be used alone, or in various combinations, by network management applications to better manage network elements.

52 Claims, 5 Drawing Sheets

U.S. PATENT DOCUMENTS

| | | | |
|---|---|---|---|
| 6,996,514 | B2 | 2/2006 | Gruber |
| 7,024,580 | B2 | 4/2006 | Guimbellot et al. |
| 7,035,919 | B1 | 4/2006 | Lee et al. |
| 7,058,717 | B2 | 6/2006 | Chao et al. |
| 7,145,881 | B1 | 12/2006 | Dawes et al. |
| 7,342,900 | B2 | 3/2008 | Xiong et al. |
| 2002/0143960 | A1 | 10/2002 | Goren et al. |
| 2002/0194251 | A1 | 12/2002 | Richter et al. |
| 2003/0005023 | A1 | 1/2003 | Gilbert et al. |
| 2003/0112948 | A1 | 6/2003 | Brown et al. |
| 2003/0158940 | A1 | 8/2003 | Leigh |
| 2003/0187967 | A1 | 10/2003 | Walsh et al. |
| 2004/0008724 | A1 | 1/2004 | Devine et al. |
| 2004/0064583 | A1 | 4/2004 | Dani et al. |
| 2004/0215761 | A1 | 10/2004 | Fujii et al. |
| 2004/0221191 | A1* | 11/2004 | Porras et al. ............ 714/4 |
| 2005/0015504 | A1 | 1/2005 | Dorne et al. |
| 2005/0027862 | A1 | 2/2005 | Nguyen et al. |
| 2005/0152308 | A1* | 7/2005 | Seol et al. ............ 370/328 |
| 2005/0207380 | A1 | 9/2005 | Blasco Claret et al. |
| 2006/0106938 | A1 | 5/2006 | Dini et al. |
| 2006/0165052 | A1 | 7/2006 | Dini et al. |

FOREIGN PATENT DOCUMENTS

| | | |
|---|---|---|
| JP | 2002-269060 | 9/2002 |
| WO | 2007078643 A3 | 7/2007 |

OTHER PUBLICATIONS

Dr. Sidnie Feit, SNMP, A Guide to Network Management, McGraw-Hill, Inc., 1995, 702 pages.

Harold Ascher, et al., "Repairable Systems Reliability, Modeling, Interference, Misconceptions and Their Causes," Lecture Notes in Statistics, vol. 7, 1984, 239 pages.

Alain Pages, et al., "System Reliability Evaluation & Prediction in Engineering," 1986, 367 pages.

Alan Bivens, Sever/Application State Protocol version 1 (SASPv1), IMB TJ Watson Research Center Internet Draft, Jun. 2004, 33 pages.

Growing Your E-Business with IBM Server Load Balancing and Caching embedded solutions, http://www.networking.ibm.com/nhd/webnav.nsf.pages/white:serverload.html 8 pages.

B. Giffo-Schmitt, International Preliminary Report on Patentability, published by WIPO, Geneva, Switzerland, Jul. 1, 2008, 5 pages.

L. W. Young, Written Opinion of the International Searching Authority, published by USPTO, Alexandria, Virginia, Mar. 11, 2008, 4 pages.

Dongarra, "Three tools to help with cluster and grid computing: SANS-Effort, PAPI, and NetSolve", Proceedings CCGRID 2002, $2^{nd}$ IEEE/ACM International Symposium on Cluster Computing and the Grid, 2002, 11 pages.

* cited by examiner

APPROACH FOR CHARACTERIZING THE DYNAMIC AVAILABILITY BEHAVIOR OF NETWORK ELEMENTS

RELATED APPLICATIONS

This application is related to U.S. patent application Ser. No. 10/714,192, filed on Nov. 14, 2003, entitled METHOD AND APPARATUS FOR MEASURING THE AVAILABILITY OF A NETWORK ELEMENT OR SERVICE. This application is also related to U.S. patent application Ser. No. 10/995,453, filed on Nov. 22, 2004, entitled APPROACH FOR DETERMINING THE REAL TIME AVAILABILITY OF A GROUP OF NETWORK ELEMENTS. The contents of both applications are hereby incorporated herein by reference in their entirety for all purposes.

FIELD OF THE INVENTION

The present invention generally relates to the analysis of network elements and services. The invention relates more specifically to an approach for characterizing the dynamic availability behavior of network elements.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks typically are comprised of multiple network elements, such as routers, that communicate data to each other. Working together or individually, network elements may provide various services. For example, several routers working together may provide a voice-over-IP service.

The quality of network elements or services may be measured according to various metrics. One metric used to measure the quality of network elements and services is the availability metric. At least in theory, a network element's availability with respect to a given time period should reflect the fraction of that time period that the network element was at least partially operational. To simplify the discussion herein, availability is discussed in the context of network elements. However, the following references to the availability of network elements apply equivalently any other kind of computing element, and to services.

The availability metric theoretically could be used for many different purposes. For example, if obtained accurately, the availability metric might be used to perform availability-based routing. Given multiple network routes between a specified source and a specified destination, availability-based routing would seek to determine and use the route that contains network elements having the highest aggregate availability. As another example, the availability metric might be used for load balancing. Given the availability of multiple network elements to participate in a task, load balancing would seek to distribute the task to network elements having the highest availability.

Conventional approaches for determining network element availability have significant drawbacks. Some approaches approximate the availability of types or classes of network elements generally and then apply those approximations to specific network elements. In real-time operation however, the actual availability of a specific network element can vary greatly from the availability approximated for the corresponding type or class of network element. Other approaches estimate future availability based upon past or current availability of a network element. To be truly effective however, some management applications require information about the duration and frequency of network element operational states, which is not available through conventional approaches based upon measurements and estimates.

Given the limitations in conventional approaches, there is a need for an approach for characterizing the availability behavior of network elements that does not suffer from limitations of prior approaches.

BRIEF DESCRIPTION OF THE DRAWINGS

In the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  I. OVERVIEW
  II. STABILITY ORDER
  III. INSTABILITY ORDER
  IV. REPEATABILITY ORDER
  V. MULTIPLICITY ORDER
  VI. DYNAMIC AVAILABILITY BEHAVIOR FUNCTION
  VII. GENERATING AND MANAGING DYNAMIC AVAILABILITY DATA
  VIII. IMPLEMENTATION MECHANISMS
  IX. EXTENSIONS AND ALTERNATIVES I. Overview An approach is provided for characterizing the dynamic availability behavior of network elements using metrics that indicate patterns of availability of a network element over time. The metrics provide an indication of stability and instability of a network element and include one stability metric and three instability metrics. The stability metric is a stability order that indicates how long an operational state of a network element holds with respect to a prior operational state. The instability metrics include an instability order, a repeatability order and a multiplicity order. The instability order indicates how quickly a network element changes operational states. The repeatability order indicates short-term instability of a network element within a vicinity of a change in operational state. The multiplicity order indicates long-term instability of a network element.

Each of these metrics is described in more detail hereinafter and may be used alone, or in various combinations, depending upon the requirements of a particular implementation. For purposes of explanation, embodiments of the invention are described herein in the context of characterizing the dynamic availability behavior of network elements with respect to two operational states: enabled and disabled. The approach, however, is applicable to any type and number of operational states.

II. Stability Order

The stability order metric indicates how long an operational state holds with respect to a prior operational state. Stated another way, the stability order metric indicates how stable a particular operational state is with respect to a prior operational state. The stability order is specific to each operational state of each network element and may change over time. Thus, a network element may have various stability orders over time for each operational state and a new stability order may be determined after each operational state change.

Figure 1:
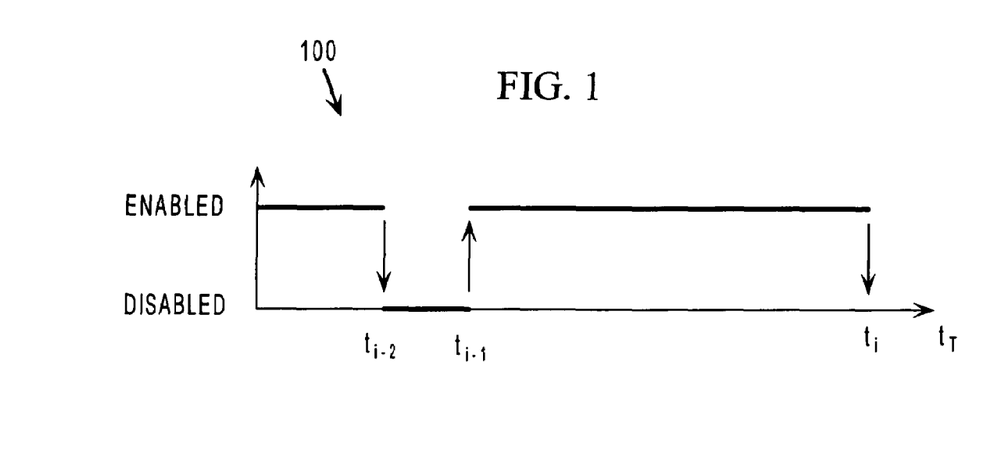
FIG. 1 is a block diagram that depicts the state of a network element over time.

FIG. 1 depicts the operational state of a network element over time $t_T$. More specifically, FIG. 1 depicts that the network element is operating in an enabled operational state prior to timestamp $t_{i-2}$ and at timestamp $t_{i-2}$ transitions to a disabled operational state. At timestamp $t_{i-1}$ the network element transitions from the disabled operational state to the enabled operational state and remains in the enabled operational state from timestamp $t_{i-1}$ to at least timestamp $t_i$.

According to one embodiment of the invention, the stability order of the network element on $\delta_{i-1,i}=t_i-t_{i-1}$ is defined by k (integer value)=$[(t_i/t_{i-1})-1]$. The stability order reflects state change events and depends only upon the $t_i$ timestamps that indicate when operational state changes occur. For example, suppose that timestamp $t_{i-1}$ is at time 1 and timestamp $t_i$ is at time 10. In this example, the stability order of the enabled state of the network element for the time period $t_{i-1}$ to $t_i$ is (10/1)−1=9. As another example, suppose that timestamp $t_{i-1}$ is at time 10 and timestamp $t_i$ is at time 10000. In this example, the stability order of the enabled state of the network element for the time period $t_{i-1}$ to $t_i$ is (10000/10)−1=999. The relatively higher stability order of the second example indicates a relatively higher stability compared to the first example, i.e., that the enabled state has held for a relatively longer period of time since the preceding state change. The notation k and k' are used herein to refer to the stability order of the enabled operation state and the disabled operational state, respectively.

Over time, each operational state of a network element may have numerous stability orders that may vary significantly in magnitude. This is attributable to the fact that the time between operational state changes may vary over time. For management purposes, it is sometimes valuable to know the range of stability orders for a particular operational state of a particular network element over time. According to one embodiment of the invention, minimum and maximum stability orders, referred to herein as $k_{min}$ and $k_{max}$ for the enabled operational state, and $k'_{min}$ and $k'_{max}$ for the enabled operational state, are determined for each operational state of a network element for each $t_i$.

III. Instability Order

The instability order metric indicates how quickly a network element changes operational states based upon the magnitude of the interval separating consecutive rapid event occurrences. The instability order reflects state change events and like the stability order, depends only upon the $t_i$ timestamps that indicate when operational state changes occur. The instability order is defined as having a magnitude of p, if $\delta_{i-1,i}=10^{-p} \times t_{i-1}$.

Some network elements are inherently stable and only rarely transition between operational states. In these situations, the instability order must be determined over very long periods of time. According to one embodiment of the invention, a logarithmic function is used for determining the instability order over long periods of time as follows: $p=[-\log(t_i-t_{i-1})/t_{i-1}]$, where the instability order is an integer value. As an example, suppose that timestamp $t_{i-1}$ occurs at a time 1 and timestamp $t_i$ occurs at a time 10. In this example, the instability order of the enabled state of the network element for the time period $t_{i-1}$ to $t_i$ is −log(10−1)/1=−0.9542, or −1. As another example, suppose that the timestamp $t_{i-1}$ occurs at time 1 and the timestamp $t_i$ occurs at time 1000. In this example, the instability order of the enabled state of the network element for the time period $t_{i-1}$ to $t_i$ is −log(1000−1)/1=−2.999, or −3. As yet another example, suppose that the timestamp $t_{i-1}$ occurs at a time 1 and the timestamp $t_i$ occurs at a time 10000. In this example, the instability order of the enabled state of the network element for the time period $t_{i-1}$ to $t_i$ is −log(10000−1)/1=−3.999, or −4. Thus, a larger negative instability order value indicates less instability (greater stability), while an instability order closer to 0 indicates greater instability (less stability). The use of a log function is not required, although without it, instability orders may become large when calculated for long periods of time.

A network element may have different instability orders $\{p_1, p_2, \ldots p_s\}$ over a time period $t_T$ for each operational state. In some situations, it may be desirable to calculate a complete set of instability orders for certain operational states. In other situations, where there exists a large number of instability orders for an operational state, it may be desirable to reduce the amount of instability data that is maintained. According to one embodiment of the invention, the instability order of an operational state is described by a minimum instability order and a maximum instability order, $[p_{min}, p_{max}]$, where $p_{min}=\min\{p_i|1<=i<=s\}$ and $p_{max}=\max\{p_i|1<=i<=s\}$. Other techniques may be used to reduce the amount of instability order data maintained for a particular operational state, such as maintaining instability order data for particular time periods of interest.

Across any given time period, short intervals between operational state changes may occur many times, either with the same or different instability orders. Therefore, according to one embodiment of the invention, an instability order is further characterized by its repeatability, over the short term, or its multiplicity, over the long term.

IV. Repeatability Order

Figure 2:
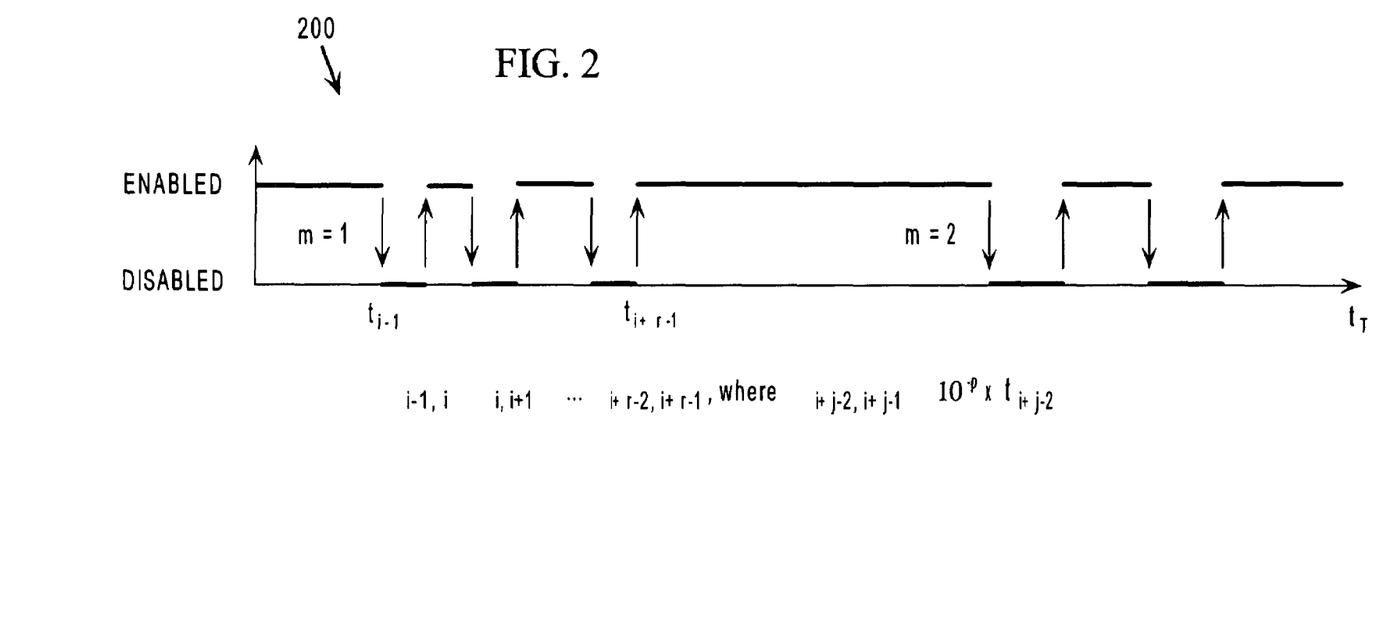
FIG. 2 is a block diagram that depicts the state of a network element over time and the availability behavior of the network element characterized by an instability order, a repeatability order and a multiplicity order.

If an instability order occurs r times consecutively, then the instability of order p has a repeatability of order r. FIG. 2 visually depicts operational state changes of a network device, having an instability order p and a repeatability order r. Thus, if $\delta_{i+j-2, i+j-1} \approx 10^{-p} \times t_{i+j-2}$, for $j=1, 2, \ldots r$, then the instability behavior is characterized as having an instability of order p and a repeatability of order r.

Each instability order $p_i$ may have any number of different repeatability orders $\{r_{i0}, r_{i1} \ldots r_{iw}\}$ over time. For example, during one period of time, an operational state of a particular network element may have a particular instability order with a repeatability order of ten, indicating that the particular instability order occurred ten times consecutively. This may occur, for example, if an external stimulus is repeatedly causing the particular network element to enter a disabled operational state. Administrative personnel discover and rectify the external stimulus, thereby curing that particular instability. Sometime later, a different external stimulus causes the particular network element to enter the disabled state on an intermittent basis. This time, however, the particular instability order does not occur ten times consecutively. Thus, the particular instability order has a different repeatability order.

According to one embodiment of the invention, each instability order $p_i$ is characterized by $r_{i/min}=\min\{r_{ij}|0<=j<=w, 1<=i<=s\}$ and by $r_{i/max}=\max\{r_{ij}|0<=j<=w, 1<=i<=s\}$. This is semantically equivalent to the minimum and maximum number of consecutive change intervals of the same range p, within an approximation given by the error of the function $f(x)=[x]$. Repeatability orders may be expressed as integers.

V. Multiplicity Order

The instability order and repeatability order characterize the availability behavior of a network element in the vicinity of the time $t_{i-1}$ by considering j consecutive time intervals $\delta_{i+j-2, i+j-1}$ that satisfy the instability order $p_i$. The multiplicity order indicates the number of times within a time period $t_T$ that this behavior occurs. More specifically, a multiplicity order of m indicates the number of times that a network element has experienced an instability of order $p_i$ during a specified time period, with or without a repeatability order. As depicted in FIG. 2, presuming that the instability order p and the repeatability order r are the same, the multiplicity order is 2. For the $p_1$ and $p_2$ instability orders, the tuples $(p_1, 5, 1)$ and $(p_2, 3, 1)$ describe the instability of the operational state within the time period $t_T$. Further, at any pair $(P_i, r_{ij})$, the multiplicity order $m_{(pi, rij, t)}$ indicates the number of times that the instability of order $p_i$ and repeatability $r_{ij}$ have occurred within the time period $t_T$. The multiplicity order may be represented by an integer number.

VI. Dynamic Availability Behavior Function

According to one embodiment of the invention, the aforementioned stability and instability metrics are implemented using a dynamic availability behavior function. As described hereinafter in more detail, this function is implementation independent and therefore may be implemented in a wide variety of locations using any type of computing architecture and communications protocols. For example, the function may be invoked by managed objects, that abstractly represent corresponding network elements, or by management applications. An example dynamic availability behavior function is $D_{id}(t_i)$, which is represented by the values $\{t_i, ([k_{min}, k_{max}], [k'_{min} \text{ and } k'_{max}]), (p_i), (r_{ij}), (m_{pi,rij,T})\}$ at time $t_i$, as described herein. The k and p orders are computed using formulas and the r and m orders are counters related to p occurrences. The k and p orders become relevant over some thresholds $k_0$ and $p_0$, which may be specified for each network element type. In one example implementation of this function, the input values include an identifier for the subject network element, $D_{id}$, a state change event identifier and timestamp, $k_0$ and $p_0$ threshold values and previous $D_{id}(t_{i-1})$. The output $D_{id}(t_i)$ values are computed with respect to the prior $D_{id}(t_{i-1})$ values and the $k_0$ and $p_0$ threshold values.

Figure 3:
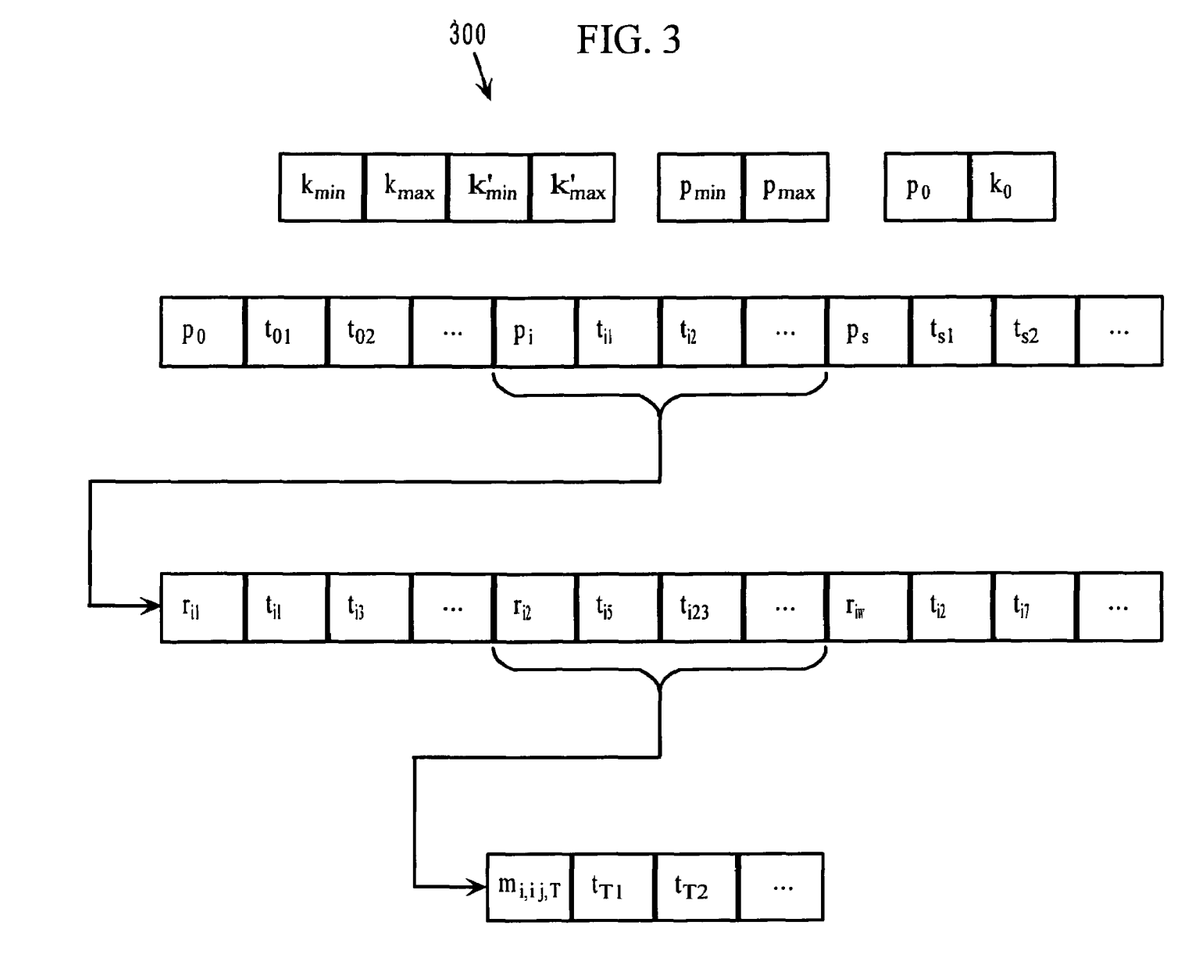
FIG. 3 is a block diagram that depicts an example data parameter representation 300 for stability and instability metric data.

FIG. 3 is a block diagram that depicts an example data parameter representation 300 that may be used to implement the approach described herein. For example, an algorithm implementing the function may use data parameter representation 300, or a variation thereof. The stability order extreme values $k_{min}$, $k_{max}$, $k'_{min}$ and $k'_{max}$ and the instability extreme values $p_{min}$, $p_{max}$ may be specified, for example, by a management application. The $k_0$ and $p_0$ thresholds are typically specific to each network element. Each computed instability order greater than or equal to p0 is attached to the list of instability orders. If the instability order has been previously computed, then only the new timestamp is attached to the instability order record field. Each distinct instability order value has its own timestamp list. Each instability order may have distinct repeatability orders. Data parameter representation 300 depicts an extended description for the order $p_i$ by all $r_{ij}$ (j=1, 2, 3 . . . ) repeatability orders. There would therefore be s number of repeatability order lists for s distinct instability orders (p). Each instability order/repeatability order pair $(p_i, r_{ij})$ can appear m times across a time period $t_T$. For management purposes, the multiplicity order m is separately identified and each increment is stamped by $t_{Ti}$. As an alternative, the multiplicity order values may be attached to the $r_{ij}$ description list, as an additional parameter.

The dynamic availability behavior metrics may be computed starting with $t_0$ (start), or at any random timestamp $t_i$. In the situation where the dynamic availability behavior metrics are computed starting with $t_0$, then the initialization includes setting $k_{min}=k_{max}=k'_{min}=k'_{max}=k_0$ and setting $p_{min}=p_{max}=p_0$. Where the dynamic availability behavior metrics are computed at some other timestamp $t_i$, then the initialization includes setting the initial values to D(ti−1).

VII. Generating and Managing Dynamic Availability Data

The aforementioned metrics may be calculated at a variety of locations within a distributed system, depending upon the requirements of a particular implementation. For example, network elements may be configured to calculate the stability and instability metrics and store the results locally. Network elements may be further configured to periodically delete metric data to reduce the amount of data stored locally. Network elements may also be configured to transmit stability and instability metric data to other network elements or applications, such as a central repository or a management application.

The aforementioned stability and instability metrics may also be generated by management applications or other entities. For example, network elements may be configured to provide timestamp data for operational state changes to a management application. The management application then uses the timestamp data to calculate the stability and instability metrics as described herein. Alternatively, network elements may provide the timestamp data to a repository and the management application then retrieves the timestamp data from the repository and generates the stability and instability metric data. The resulting metric data may be stored locally at the management application or back into the repository. The metric data may then be periodically deleted from the local storage associated with the management application, or from the repository, depending upon the requirements of a particular application.

VIII. Implementation Mechanisms

The approach described herein for characterizing the dynamic availability behavior of network elements using stability and instability metrics may be used alone or in combination with any other availability metrics for network elements. Furthermore, the approach may be used in any number of applications and contexts, depending upon the requirements of a particular application. For example, the approach may be used to rank network elements based upon their individual dynamic availability using the metrics described herein. Network elements may then be selected for particular applications based upon the rankings and the requirements of the applications. For example, some applications, e.g., network service applications, may include long-term or sensitive transactions that require a certain level of stability to provide a particular level or quality of service. Network elements may be selected to support the network service applications based upon their dynamic availability behavior or ranking. Thus, external constraints may dictate the particular network elements that are selected for a particular application. Some network element providers may even choose to charge customers different rates based upon the dynamic availability behavior ranking of the network elements made available to customers.

The dynamic availability behavior of network elements may change over time. For example, external stimuli that were causing a network element to be unstable may no longer exist. Thus, although this network element may have historically had a dynamic availability behavior that made it unsuitable for particular applications, this network element has now become stable. As another example, another network element that was historically characterized as being stable is now subjected to new external stimuli that causes the network element to become unstable. The approach described herein for characterizing the dynamic availability behavior may be periodically applied to network elements to update their corresponding metrics values. This allows a network management application to determine whether network elements are no longer suitable for a particular application and to replace those network elements with other network elements that are suitable. Similarly, a network management application may identify network elements that previously were not suitable for use in certain applications, but that have become suitable.

As previously described herein, the approach is applicable to any type and number of operational states. For example, for a particular network element that has ten operational states, the stability and instability metrics may be used to characterize the dynamic availability behavior of the particular network element with respect to each of its ten operation states, or any subset of the ten operational states.

For purposes of explanation, embodiments of the invention have been described herein in the context of calculating the stability and instability metrics based upon when operational state changes occur, without regard to the particular event that caused the changes in operational state. The approach, however, may be selectively applied to changes in operational states based upon particular events or combinations of events. This allows characterizing the dynamic availability behavior of network elements with respect to certain events, or combinations of events. This may be particularly useful for billing, auditing or failure analysis applications. The approach may also be suspended for specified periods of time, for example, during testing.

Figure 4:
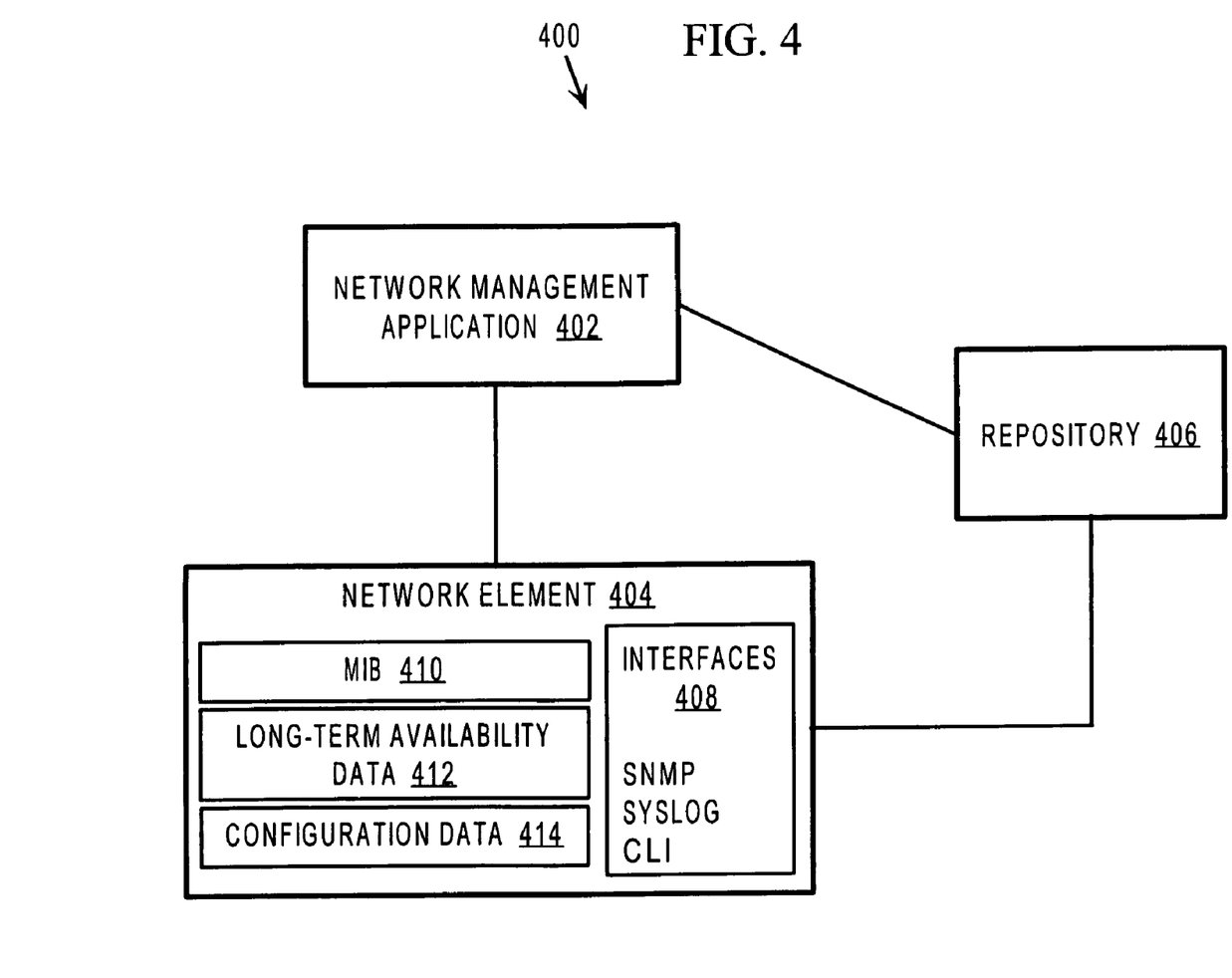
FIG. 4 is a block diagram that depicts a simplified example arrangement upon which embodiments of the invention may be implemented.

FIG. 4 is a block diagram that depicts a simplified example arrangement 400 upon which embodiments of the invention may be implemented. Arrangement 400 includes a network management application 402, a network element 404 and a repository 406. Network management application 402, network element 404 and repository 406 may be communicatively coupled via any mechanisms or media. Examples include, without limitation, one or more communications links and networks. Network element 404 may be any type of network element. Example implementations of network element 404 include, without limitation, network devices, routers, switches and gateways. The invention is not limited to these examples.

In example arrangement 400, network element 404 includes one or more interfaces 408 that support a variety of communications protocols for communicating with other network elements and applications. For example, interfaces 408 may include a SYSLOG interface and a Command Line Interface (CLI) and support a variety of communications protocols, such as the Simple Network Management Protocol (SNMP). Network element 404 also includes a Management Information Base (MIB) 410 that contains one or more objects that can be managed by network management application 402. Network element 404 also includes long-term availability data 412 that indicates the past availability of network element 404 over a long period of time.

Network element 404 further includes configuration data 414 that may specify several aspects of the approach described herein. For example, configuration data 414 may specify the operational state changes that are to be recorded by network element 404. Configuration data 414 may also specify a set of qualifying events for the operational state changes. For example, configuration data 414 may specify that network element 404 is to record a timestamp for changes in operational state made in response to particular events. Configuration data 414 may further specify a set of actions to be taken in response to operational state changes. For example, configuration data 414 may specify that timestamp data is to be generated and stored locally on network element 404 or sent to repository 406, with or without notification to network management application 402. Configuration data 414 may further specify that network element 404 is to calculate stability and instability metrics, as described herein, and store the results locally and/or send the results to repository 406. Configuration data 414 may also specify when timestamp and stability and instability metric data is to be deleted from the local storage on network element 404.

Configuration data 414 may be initialized when network element 404 is first put into service and then dynamically updated over time, depending upon the implementation. For example, if network element 404 is scheduled to be involved in testing, then network management application 402 may update configuration data 414 to indicate that no timestamp data should be generated. As another example, network management application 402 may update configuration data 414 to specify a new set of events that should trigger the generation of timestamp data. Alternatively, network element 404 may itself retrieve updated configuration data 414.

Figure 5:
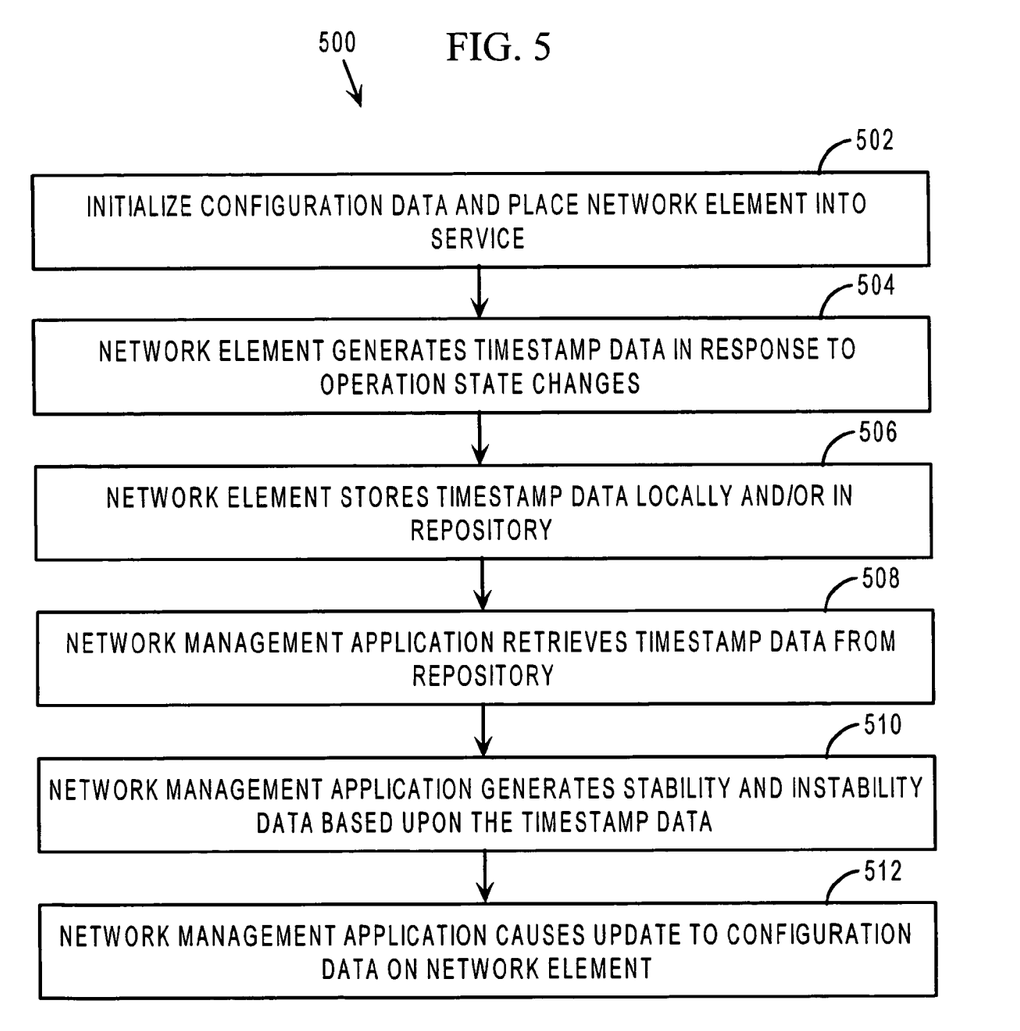
FIG. 5 is a flow diagram that depicts an approach for characterizing the dynamic availability behavior of network element according to one embodiment of the invention.

FIG. 5 is a flow diagram 500 that depicts an approach for characterizing the dynamic availability behavior of network element 404 according to one embodiment of the invention. The process flow depicted in FIG. 5 does not have to occur in the particular order depicted in FIG. 5 and may vary, depending upon the requirements of a particular application. Particular applications may also not include one or more steps depicted in FIG. 5 and may include additional steps not depicted in FIG. 5.

In step 502, network element 404 is initialized with an initial set of values and network element 404 is placed into service. In step 504, network element 404 generates timestamp data in response to detecting operational state change events and in accordance with configuration data 414. In step 506, network element 404 stores the timestamp data locally and/or provides the timestamp data to repository 406 via interfaces 408. In step 508, network management application 402 retrieves the timestamp data from repository 406. In step 510, network management application 402 generates stability and instability data based upon the timestamp data, as described herein. In step 512, network management application 402 causes configuration data 414 to be updated. This may occur for a variety of reasons, such as a change in external constraints or business policy.

Figure 6:
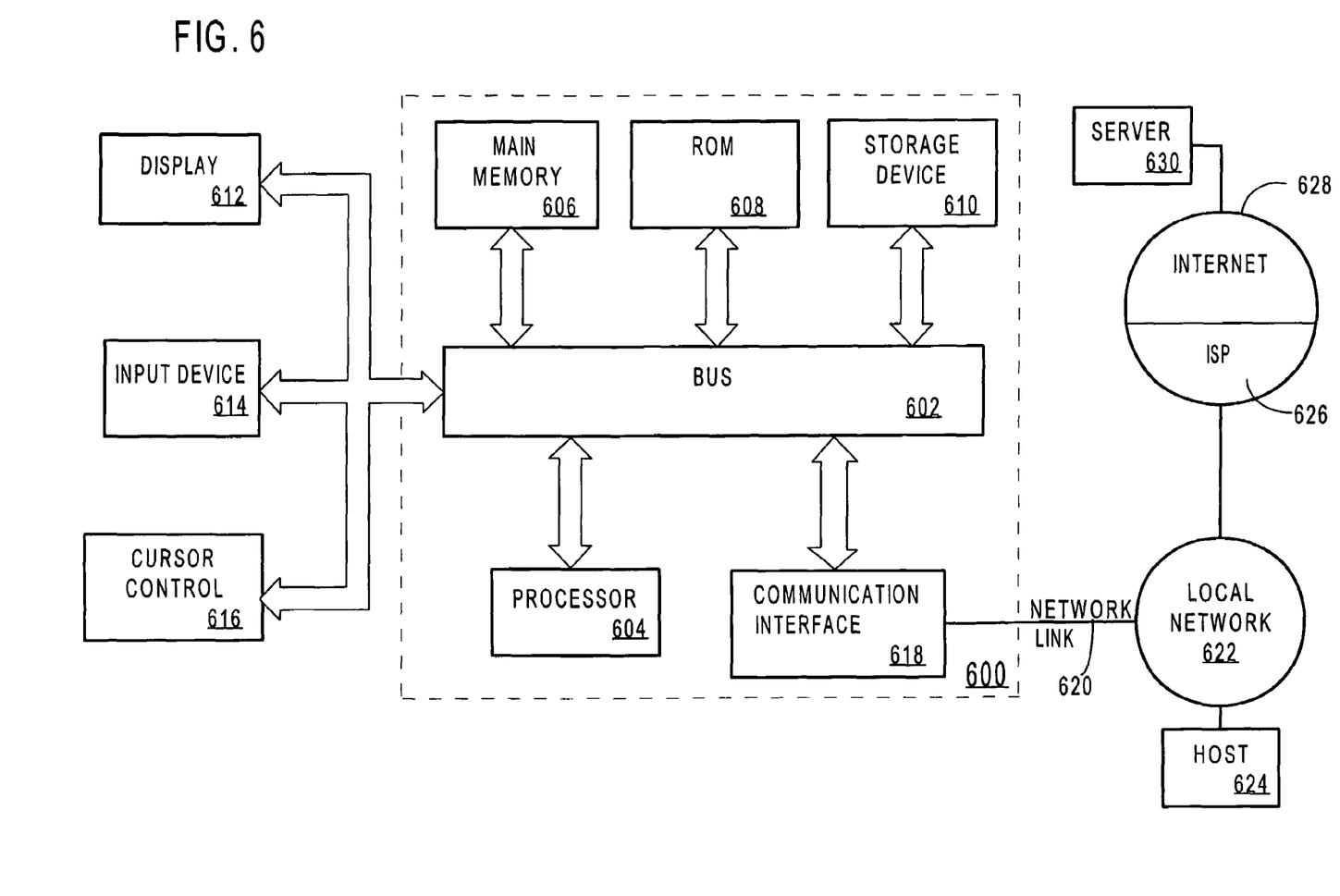
FIG. 6 is a block diagram that illustrates a computer system upon which an embodiment of the invention may be implemented.

The approach described herein for characterizing the dynamic availability behavior of network elements using stability and instability metrics may be implemented on any type of computing architecture, depending upon the requirements of a particular implementation. FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

IX. Extensions and Alternatives

Although embodiments of the invention have been described herein in the context of characterizing the dynamic availability behavior of network elements, the approach is applicable to any type of network device or network service. In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for indicating a stability of a particular operational state of a network element, the computer-implemented method comprising:
   determining a stability order value for the particular operational state of the network element based upon an amount of time that the network element has operated in the particular operational state relative to a time at which the network element transitioned to the particular operational state from another operational state.

2. The computer-implemented method as recited in claim 1, wherein:
   the network element transitioned from the another operational state into the particular operational state at a first time,
   the network element remained in the first operational state from the first time until at least a second time, wherein the second time is later than the first time, and
   determining the stability order value includes:
      calculating a quotient value of a second time value that corresponds to the second time divided by a first time value that corresponds to the first time;
      calculating a difference value that represents the difference between the quotient value and one; and
      calculating an integer value of the difference value.

3. The computer-implemented method as recited in claim 1, wherein the stability order value is a first stability order value and the computer-implemented method further comprises determining a second stability order value for the particular operational state of the network element based upon a second amount of time that the network element has operated in the particular operational state relative to a second time at which the network element transitioned to the particular operational state from the another operational state.

4. The computer-implemented method as recited in claim 3, further comprising determining a minimum stability order value and a maximum stability order value for the particular operational state of the network element based upon the first and second stability order values.

5. A computer-implemented method for indicating an operational state instability of a network element, the computer-implemented method comprising:
   determining an instability order value for a particular operational state of the network element based upon an amount of time that the network element has operated in the particular operational state and a time at which the network element transitioned to the particular operational state from another operational state.

6. The computer-implemented method as recited in claim 5, wherein:
   the network element transitioned from the another operational state into the particular operational state at a first time,
   the network element remained in the particular operational state from the first time until at least a second time, wherein the second time is later than the first time, and
   determining the instability order value includes:
      calculating a difference value that represents the difference between a second time value that corresponds to the second time and a first time value that corresponds to the first time,
      calculating a log value that represents the negative log value of the difference value, and
      calculating a quotient value of the log value divided by the first time value.

7. The computer-implemented method as recited in claim 5, wherein the instability order value is a first instability order value and the computer-implemented method further comprises determining a second instability order value for the particular operational state of the network element based upon a magnitude of a second interval separating a second set of consecutive state changes between the particular operational state and the another operational state.

8. The computer-implemented method as recited in claim 7, further comprising determining a minimum instability order value and a maximum instability order value for the particular operational state of the network element based upon the first and second instability order values.

9. The computer-implemented method as recited in claim 5, further comprising determining a repeatability order value for the instability order value that indicates a number of times that the instability order value occurs consecutively within a specified period of time.

10. The computer-implemented method as recited in claim 5, further comprising determining a plurality of repeatability order values for the instability order value over a plurality of time periods, wherein each of the plurality of repeatability order values indicates a number of times that the instability order value occurred consecutively within one of the plurality of time periods.

11. The computer-implemented method as recited in claim 10, further comprising determining a minimum repeatability order value and a maximum repeatability order value from the plurality of repeatability order values.

12. The computer-implemented method as recited in claim 5, further comprising determining a multiplicity order value for the instability order value that indicates a number of times that the instability order value occurs within a specified period of time.

13. The computer-implemented method as recited in claim 5, further comprising:
   determining a repeatability order value for the instability order value that indicates a number of times that the instability order value occurs consecutively within a specified period of time, and
   determining a multiplicity order value for the instability order value that indicates a number of times that the instability order value occurs within a specified period of time.

14. A computer-readable medium for indicating a stability of a particular operational state of a network element, the computer-readable medium carrying instructions which, when executed by one or more processors, cause:
   determining a stability order value for the particular operational state of the network element based upon an amount of time that the network element has operated in the particular operational state relative to a time at which the network element transitioned to the particular operational state from another operational state.

15. The computer-readable medium as recited in claim 14, wherein:
the network element transitioned from the another operational state into the particular operational state at a first time,
the network element remained in the first operational state from the first time until at least a second time, wherein the second time is later than the first time, and
determining the stability order value includes:
calculating a quotient value of a second time value that corresponds to the second time divided by a first time value that corresponds to the first time;
calculating a difference value that represents the difference between the quotient value and one; and
calculating an integer value of the difference value.

16. The computer-readable medium as recited in claim 14, wherein the stability order value is a first stability order value and the computer-readable medium further comprises additional instructions which, when executed by the one or more processors, cause determining a second stability order value for the particular operational state of the network element based upon a second amount of time that the network element has operated in the particular operational state relative to a second time at which the network element transitioned to the particular operational state from the another operational state.

17. The computer-readable medium as recited in claim 16, further comprising additional instructions which, when executed by the one or more processors, cause determining a minimum stability order value and a maximum stability order value for the particular operational state of the network element based upon the first and second stability order values.

18. A computer-readable medium for indicating an operational state instability of a network element, the computer-readable medium carrying instructions which, when executed by one or more processors, cause:
determining an instability order value for a particular operational state of the network element based upon an amount of time that the network element has operated in the particular operational state and a time at which the network element transitioned to the particular operational state from another operational state.

19. The computer-readable medium as recited in claim 18, wherein:
the network element transitioned from the another operational state into the particular operational state at a first time,
the network element remained in the particular operational state from the first time until at least a second time, wherein the second time is later than the first time, and
determining the instability order value includes:
calculating a difference value that represents the difference between a second time value that corresponds to the second time and a first time value that corresponds to the first time,
calculating a log value that represents the negative log value of the difference value, and
calculating a quotient value of the log value divided by the first time value.

20. The computer-readable medium as recited in claim 18, wherein the instability order value is a first instability order value and the computer-readable medium further comprises additional instructions which, when executed by one or more processors, cause determining a second instability order value for the particular operational state of the network element based upon a magnitude of a second interval separating a second set of consecutive state changes between the particular operational state and the another operational state.

21. The computer-readable medium as recited in claim 20, further comprising additional instructions which, when executed by one or more processors, cause determining a minimum instability order value and a maximum instability order value for the particular operational state of the network element based upon the first and second instability order values.

22. The computer-readable medium as recited in claim 18, further comprising additional instructions which, when executed by one or more processors, cause determining a repeatability order value for the instability order value that indicates a number of times that the instability order value occurs consecutively within a specified period of time.

23. The computer-readable medium as recited in claim 18, further comprising additional instructions which, when executed by one or more processors, cause determining a plurality of repeatability order values for the instability order value over a plurality of time periods, wherein each of the plurality of repeatability order values indicates a number of times that the instability order value occurred consecutively within one of the plurality of time periods.

24. The computer-readable medium as recited in claim 23, further comprising additional instructions which, when executed by one or more processors, cause determining a minimum repeatability order value and a maximum repeatability order value from the plurality of repeatability order values.

25. The computer-readable medium as recited in claim 18, further comprising additional instructions which, when executed by one or more processors, cause determining a multiplicity order value for the instability order value that indicates a number of times that the instability order value occurs within a specified period of time.

26. The computer-readable medium as recited in claim 18, further comprising additional instructions which, when executed by one or more processors, cause:
determining a repeatability order value for the instability order value that indicates a number of times that the instability order value occurs consecutively within a specified period of time, and
determining a multiplicity order value for the instability order value that indicates a number of times that the instability order value occurs within a specified period of time.

27. An apparatus for indicating a stability of a particular operational state of a network element, the apparatus comprising a memory having stored instructions which, when executed by one or more processors, cause:
determining a stability order value for the particular operational state of the network element based upon an amount of time that the network element has operated in the particular operational state relative to a time at which the network element transitioned to the particular operational state from another operational state.

28. The apparatus as recited in claim 27, wherein:
the network element transitioned from the another operational state into the particular operational state at a first time,
the network element remained in the first operational state from the first time until at least a second time, wherein the second time is later than the first time, and determining the stability order value includes:
calculating a quotient value of a second time value that corresponds to the second time divided by a first time value that corresponds to the first time;
calculating a difference value that represents the difference between the quotient value and one; and
calculating an integer value of the difference value.

29. The apparatus as recited in claim 27, wherein the stability order value is a first stability order value and the memory further comprises additional instructions which, when executed by the one or more processors, cause determining a second stability order value for the particular operational state of the network element based upon a second amount of time that the network element has operated in the particular operational state relative to a second time at which the network element transitioned to the particular operational state from the another operational state.

30. The apparatus as recited in claim 29, wherein the memory further comprises additional instructions which, when executed by the one or more processors, cause determining a minimum stability order value and a maximum stability order value for the particular operational state of the network element based upon the first and second stability order values.

31. An apparatus for indicating an operational state instability of a network element, the apparatus comprising a memory storing instructions which, when executed by one or more processors, cause:
determining an instability order value for a particular operational state of the network element based upon an amount of time that the network element has operated in the particular operational state and a time at which the network element transitioned to the particular operational state from another operational state.

32. The apparatus as recited in claim 31, wherein:
the network element transitioned from the another operational state into the particular operational state at a first time,
the network element remained in the particular operational state from the first time until at least a second time, wherein the second time is later than the first time, and
determining the instability order value includes:
calculating a difference value that represents the difference between a second time value that corresponds to the second time and a first time value that corresponds to the first time,
calculating a log value that represents the negative log value of the difference value, and
calculating a quotient value of the log value divided by the first time value.

33. The apparatus as recited in claim 31, wherein the instability order value is a first instability order value and the memory further comprises additional instructions which, when executed by one or more processors, cause determining a second instability order value for the particular operational state of the network element based upon a magnitude of a second interval separating a second set of consecutive state changes between the particular operational state and the another operational state.

34. The apparatus as recited in claim 33, wherein the memory further comprises additional instructions which, when executed by one or more processors, cause determining a minimum instability order value and a maximum instability order value for the particular operational state of the network element based upon the first and second instability order values.

35. The apparatus as recited in claim 31, wherein the memory further comprises additional instructions which, when executed by one or more processors, cause determining a repeatability order value for the instability order value that indicates a number of times that the instability order value occurs consecutively within a specified period of time.

36. The apparatus as recited in claim 31, wherein the memory further comprises additional instructions which, when executed by one or more processors, cause determining a plurality of repeatability order values for the instability order value over a plurality of time periods, wherein each of the plurality of repeatability order values indicates a number of times that the instability order value occurred consecutively within one of the plurality of time periods.

37. The apparatus as recited in claim 36, wherein the memory further comprises additional instructions which, when executed by one or more processors, cause determining a minimum repeatability order value and a maximum repeatability order value from the plurality of repeatability order values.

38. The apparatus as recited in claim 31, wherein the memory further comprises additional instructions which, when executed by one or more processors, cause determining a multiplicity order value for the instability order value that indicates a number of times that the instability order value occurs within a specified period of time.

39. The apparatus as recited in claim 31, wherein the memory further comprises additional instructions which, when executed by one or more processors, cause:
determining a repeatability order value for the instability order value that indicates a number of times that the instability order value occurs consecutively within a specified period of time, and
determining a multiplicity order value for the instability order value that indicates a number of times that the instability order value occurs within a specified period of time.

40. An apparatus for indicating a stability of a particular operational state of a network element, the apparatus comprising:
means for obtaining a time value that represents a time at which the network element transitioned to the particular operational state from another operational state;
means for determining a stability order value for the particular operational state of the network element based upon an amount of time that the network element has operated in the particular operational state relative to the time value.

41. The apparatus as recited in claim 40, wherein:
the network element transitioned from the another operational state into the particular operational state at a first time,
the network element remained in the first operational state from the first time until at least a second time, wherein the second time is later than the first time, and
the means for determining the stability order value includes:
means for calculating a quotient value of a second time value that corresponds to the second time divided by a first time value that corresponds to the first time;
means for calculating a difference value that represents the difference between the quotient value and one; and
means for calculating an integer value of the difference value.

42. The apparatus as recited in claim 40, wherein the stability order value is a first stability order value and the apparatus further comprises means for determining a second stability order value for the particular operational state of the network element based upon a second amount of time that the network element has operated in the particular operational state relative to a second time at which the network element transitioned to the particular operational state from the another operational state.

43. The apparatus as recited in claim 42, wherein the apparatus further comprises means for determining a minimum stability order value and a maximum stability order value for the particular operational state of the network element based upon the first and second stability order values.

44. An apparatus for indicating an operational state instability of a network element, the apparatus comprising:
   means for obtaining a time value that represents a time at which the network element transitioned to a particular operational state from another operational state;
   means for determining an instability order value for the particular operational state of the network element based upon an amount of time that the network element has operated in the particular operational state and the time value.

45. The apparatus as recited in claim 44, wherein:
   the network element transitioned from the another operational state into the particular operational state at a first time,
   the network element remained in the particular operational state from the first time until at least a second time, wherein the second time is later than the first time, and
   the means for determining the instability order value includes:
      means for calculating a difference value that represents the difference between a second time value that corresponds to the second time and a first time value that corresponds to the first time,
      means for calculating a log value that represents the negative log value of the difference value, and
      means for calculating a quotient value of the log value divided by the first time value.

46. The apparatus as recited in claim 44, further comprising means for determining a second instability order value for the particular operational state of the network element based upon a magnitude of a second interval separating a second set of consecutive state changes between the particular operational state and the another operational state.

47. The apparatus as recited in claim 46, further comprising means for determining a minimum instability order value and a maximum instability order value for the particular operational state of the network element based upon the first and second instability order values.

48. The apparatus as recited in claim 44, further comprising means for determining a repeatability order value for the instability order value that indicates a number of times that the instability order value occurs consecutively within a specified period of time.

49. The apparatus as recited in claim 44, further comprising means for determining a plurality of repeatability order values for the instability order value over a plurality of time periods, wherein each of the plurality of repeatability order values indicates a number of times that the instability order value occurred consecutively within one of the plurality of time periods.

50. The apparatus as recited in claim 49, further comprising means for determining a minimum repeatability order value and a maximum repeatability order value from the plurality of repeatability order values.

51. The apparatus as recited in claim 44, further comprising means for determining a multiplicity order value for the instability order value that indicates a number of times that the instability order value occurs within a specified period of time.

52. The apparatus as recited in claim 44, further comprising means for:
   determining a repeatability order value for the instability order value that indicates a number of times that the instability order value occurs consecutively within a specified period of time, and
   determining a multiplicity order value for the instability order value that indicates a number of times that the instability order value occurs within a specified period of time.

* * * * *

UNITED STATES PATENT AND TRADEMARK OFFICE
CERTIFICATE OF CORRECTION

PATENT NO. : 7,631,225 B2 Page 1 of 1
APPLICATION NO. : 10/956286
DATED : December 8, 2009
INVENTOR(S) : Dini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1342 days.

Signed and Sealed this

Twenty-first Day of December, 2010

David J. Kappos
*Director of the United States Patent and Trademark Office*